INVENTOR.
HUGH J. NELSON

Sept. 13, 1966  H. J. NELSON  3,272,330
APPARATUS FOR RECLAIMING METAL VALUES FROM SLAG
Filed June 21, 1963  6 Sheets-Sheet 2

INVENTOR.
HUGH J. NELSON
BY

Sept. 13, 1966    H. J. NELSON    3,272,330
APPARATUS FOR RECLAIMING METAL VALUES FROM SLAG
Filed June 21, 1963    6 Sheets-Sheet 3

INVENTOR.
HUGH J. NELSON
BY

Sept. 13, 1966 H. J. NELSON 3,272,330
APPARATUS FOR RECLAIMING METAL VALUES FROM SLAG
Filed June 21, 1963 6 Sheets-Sheet 4

INVENTOR.
HUGH J. NELSON
BY

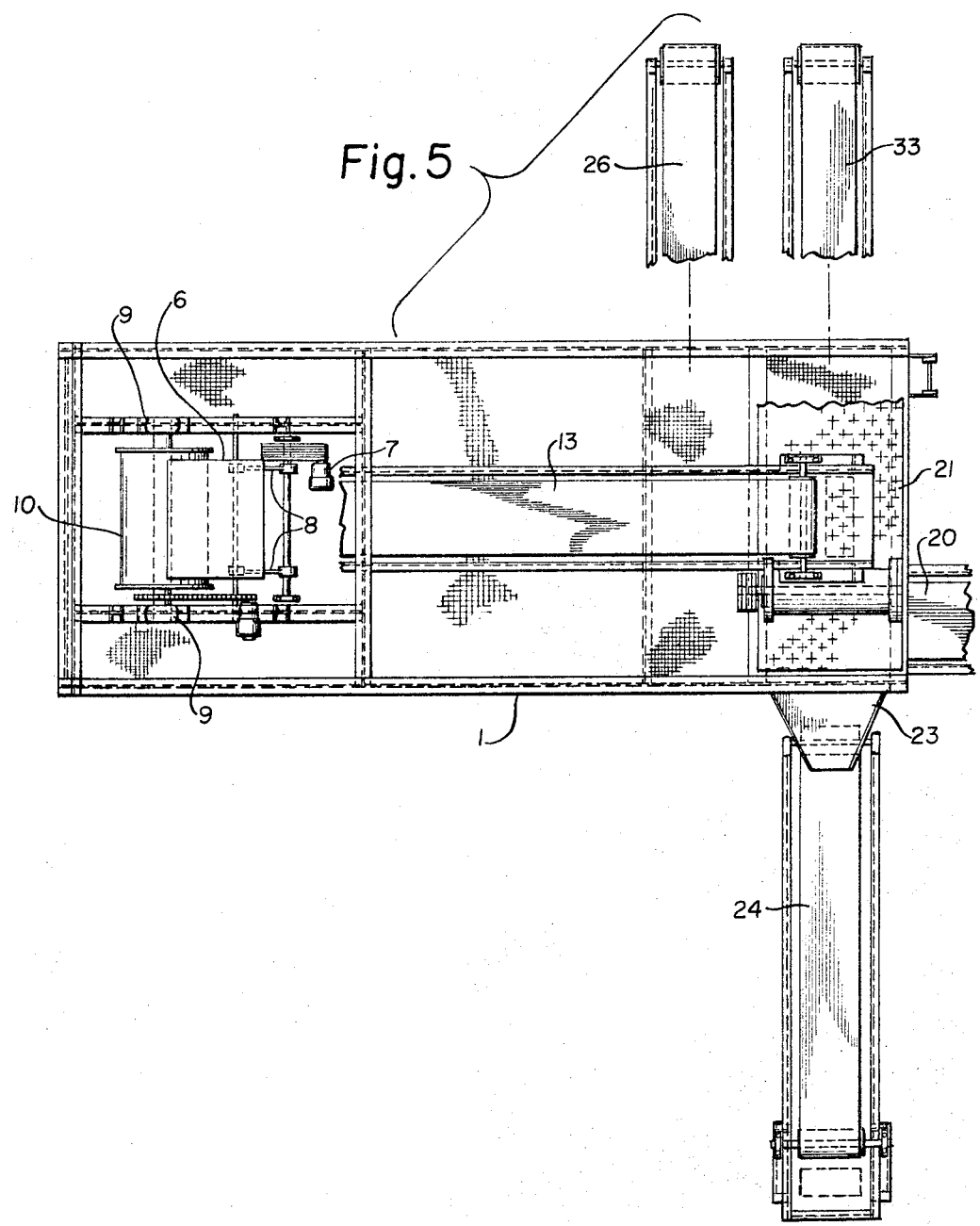

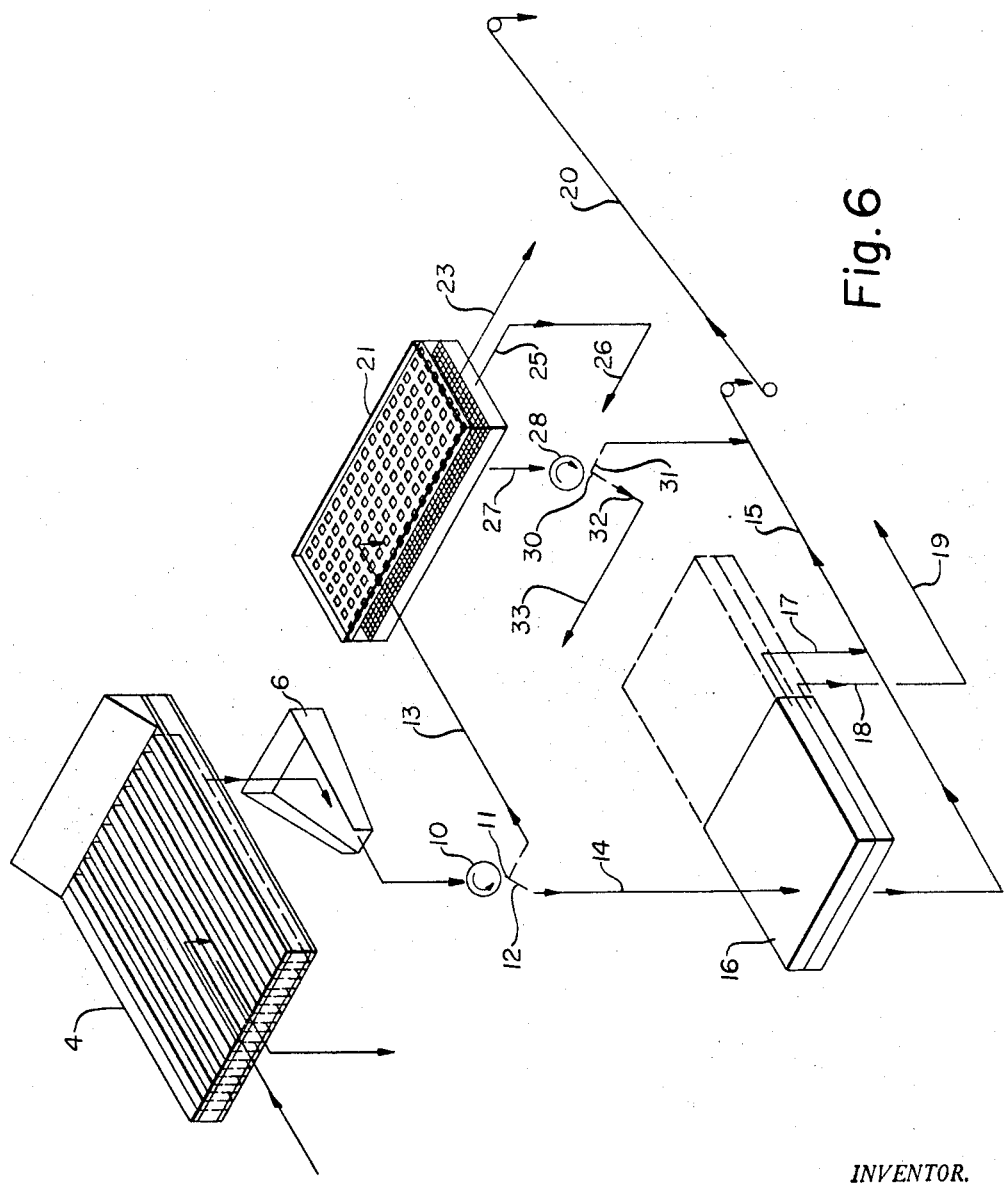

United States Patent Office 3,272,330
Patented Sept. 13, 1966

3,272,330
APPARATUS FOR RECLAIMING METAL VALUES FROM SLAG
Hugh J. Nelson, University Heights, Ohio, assignor to The Kaiser-Nelson Corporation, Cleveland, Ohio, a corporation of Ohio
Filed June 21, 1963, Ser. No. 289,578
2 Claims. (Cl. 209—38)

This invention relates generally to an apparatus for reclaiming available iron or steel from open hearth slag, steel mill cleanup or debris, foundry refuse and other materials containing iron in a free or combined state, and to the beneficiation of any refuse remaining after such reclamation, whereby such refuse can be used for various purposes, such as a blast furnace burden, as fill, ballast, or road surfacing medium.

A primary object of the invention is to provide apparatus of the character which is extremely compact in its design and arrangement of parts, whereby the overall dimensions are such as to enable the apparatus to be easily transported by means of a tractor or truck on narrow gauge highways and to slag dumps and the like, for use at locations adjacent such dumps.

Another object of the invention is to provide apparatus of the character described, which can, under certain conditions, as for bridge or viaduct clearance, be partially dismantled for this purpose, and quickly reassembled.

A further object of the invention is to provide apparatus of the character described, in which the waste materials which constitute the bulk of the original treated material, are disposed of at relatively low levels, and are not required to be carried to a high level, whereby gravity is used to a maximum degree or extent in the handling of the materials, and electrical and mechanical power required for such handling is reduced to a minimum, with consequent savings in equipment cost and labor.

A still further object of the invention is to provide apparatus of the character described, in which only the metallics, constituting a relatively small proportion of the material which is being treated, is required to be carried to a relatively high level for further treatment, whereby further savings in cost of labor, electrical and mechanical power and equipment, are effected.

Other objects and advantages of my invention will be apparent during the course of the following description.

In the accompanying drawings forming a part of this specification, and in which like numerals are employed to designate like parts throughout the same, FIG. 1 is a side elevational view of a portable apparatus embodying the invention;

FIG. 5 is a horizontal cross-sectional view of the apparatus, taken on the line 5—5 of FIG. 1, and FIG. 6 is a flow diagram, illustrating in somewhat diagrammatic form, the method of the invention, as applied to the treatment of a conventional open hearth slag.

Figure 1:
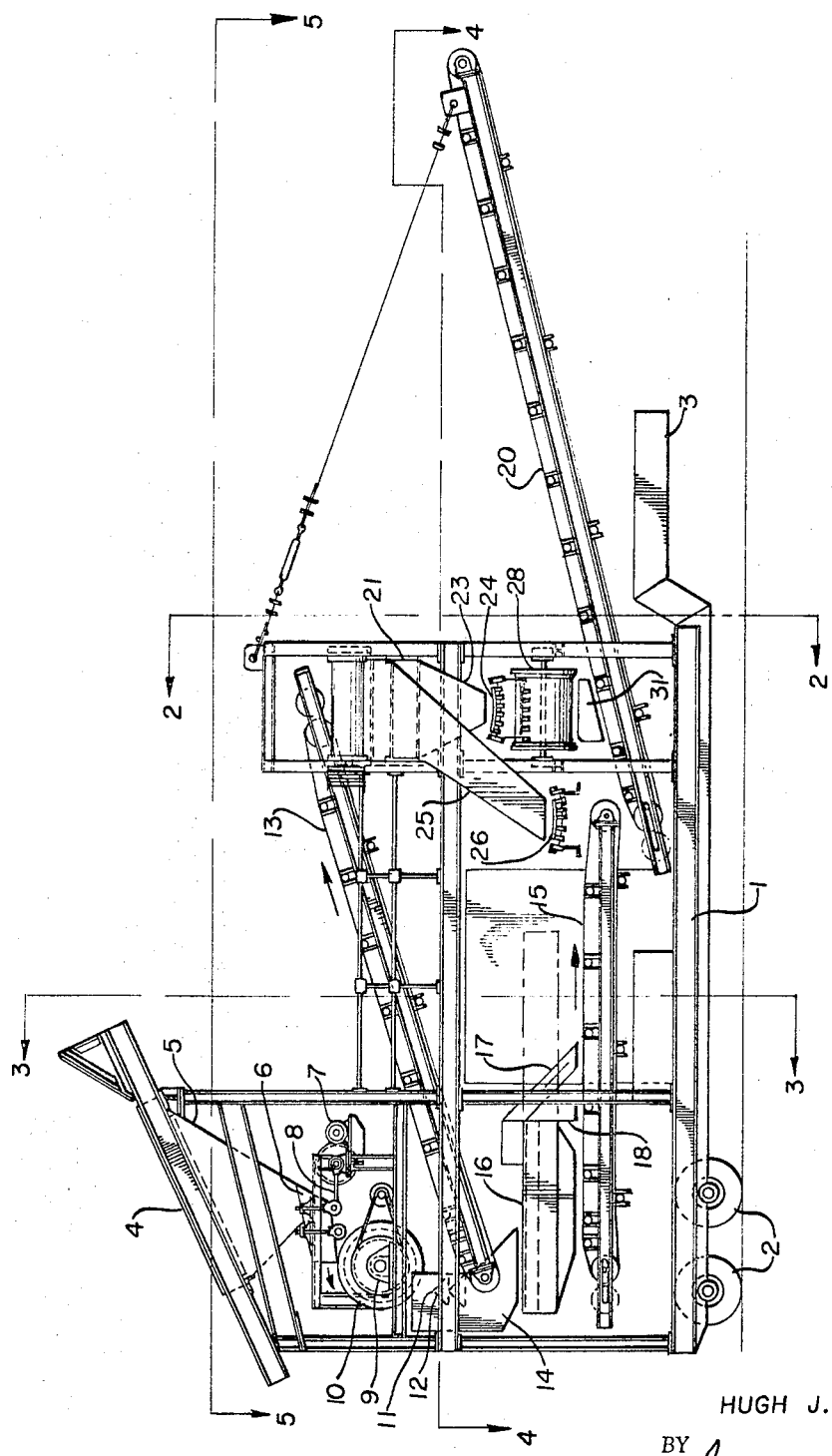

Referring more particularly to FIGS. 1 to 5 inclusive of the drawings, the apparatus will be seen to comprise a structural steel frame 1 which is supported at its rear end on wheels 2 and is provided at its front end with a fifth wheel assembly 3, which is adapted to be supported on a tractor or truck (not shown).

Mounted, in an inclined position, on the upper end of the frame 1, above the wheels 2, is a grizzly 4, which is essentially a heavy screen consisting of steel strips spaced laterally from each other in a manner to permit material of less than a predetermined maximum size to pass through the spaces between the strips and to retain on the strips the material which is of a size in excess of this maximum, the latter material rolling off the grizzly or being raked therefrom, and falling to the rear of the frame 1 for subsequent treatment, as will be described hereinafter.

Disposed below the grizzly 4 is a hopper 5 provided with an outlet at its lower end, which outlet is positioned above the receiving end of an inclined shaker feeder 6, which feeder is reciprocated by a motor 7 through a crank 8.

Mounted on frame 1, in bearings 9, is an electrically driven rotating magnetic separator 10 onto which the materials from the feeder 6 fall. The magnetic separator, which is essentially a drum having a magnetized exterior surface, separates the material falling thereon into two components, one of which includes particles having an appreciable quantity of steel or iron embedded therein and the other of which includes only particles substantially free of steel or iron. The first component, which has a high magnetic susceptibility, will have a greater length of circumferential travel on the drum surface, and will therefore be carried by the drum to a position to the right of the apex 11 of a diverter bar 12, as shown in FIG. 1, at which position, the particles will fall onto an inclined endless belt conveyor 13, supported on the frame 1. The second component, which has virtually no magnetic susceptibility, will not be attracted by the separator 10 and will fall vertically onto the diverter bar 12, at a position to the left of the apex 11 of this bar, as shown in FIG. 1, and will drop through a chute 14.

The chute 14 is adapted to direct flow of the non-magnetic material either directly to an endless belt waste conveyor 15, or to a double-deck screen 16.

When it is desired not to size beneficiate the non-magnetic material, the screen 16 is moved to the position shown in broken lines in FIG. 1, so that the chute 14 directs the material directly to the conveyor 15.

Figure 3:
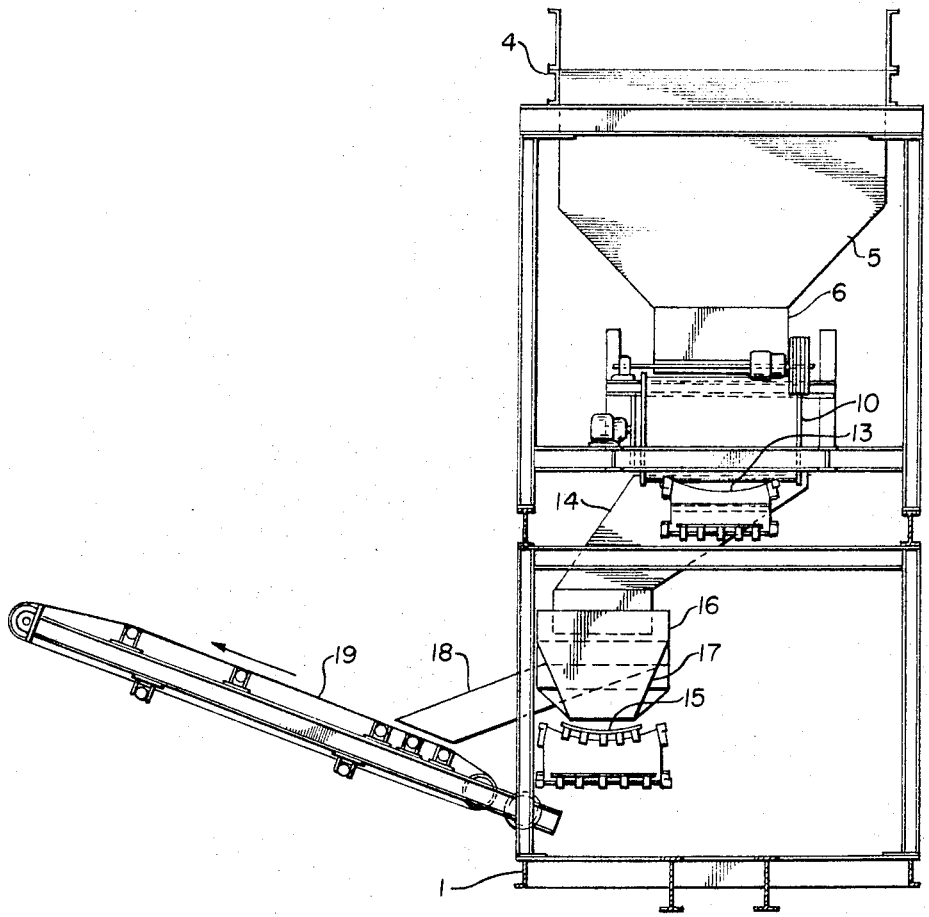
FIG. 3 is a cross-sectional view of the apparatus, taken on the line 3—3 of FIG. 1.
Figure 4:
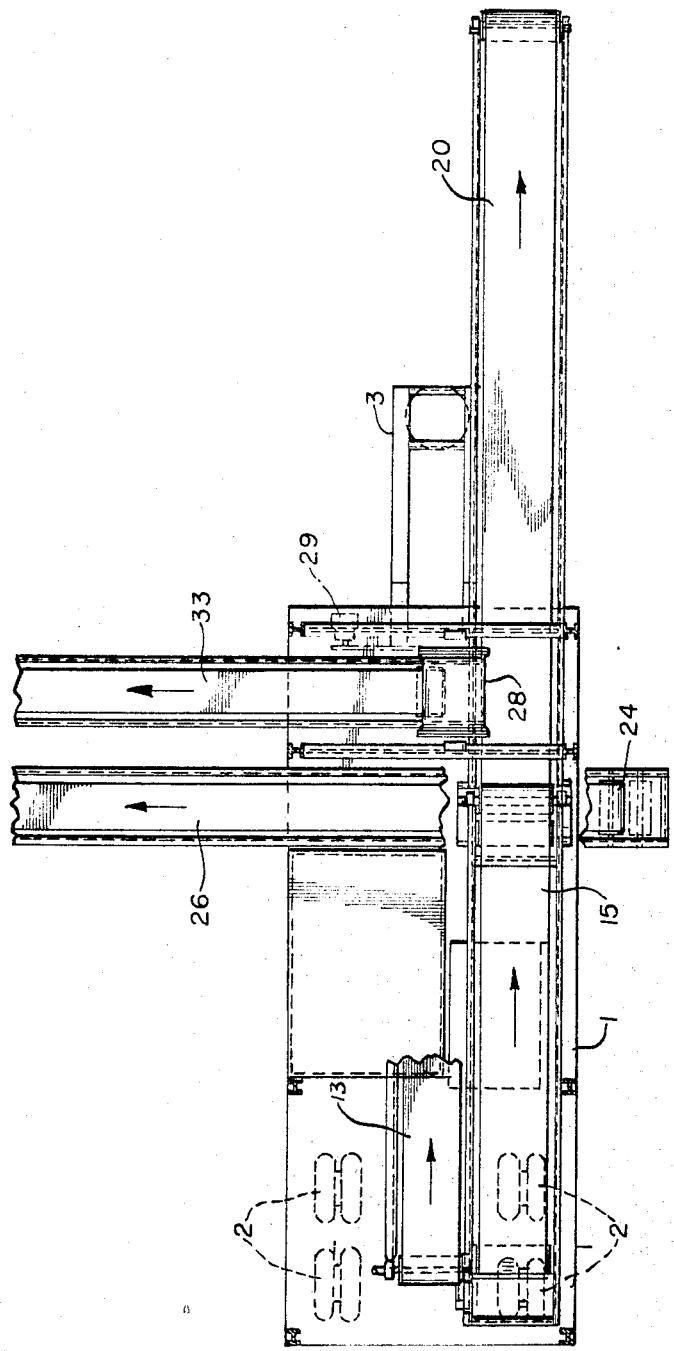
FIG. 4 is a horizontal cross-sectional view of the apparatus, taken on the line 4—4 of FIG. 1.

When it is desired to size beneficiate or screen the non-magnetic material to specified sizes, the screen 16 is moved to the position shown in solid lines in FIG. 1, in which position, the chute 14 directs the material to the screen. The material rejected by the upper deck of the screen 16 passes through a chute 17 onto the conveyor 15. The material which passes through the upper deck but is rejected by the lower deck, passes through a chute 18 and onto an inclined endless belt conveyor 19, which extends laterally of the frame 1, as best shown in FIG. 3. The material which passes through both decks of the screen 16 passes onto the conveyor 15.

The material which falls onto the conveyor 15 is carried by this conveyor to the lower end of an inclined endless belt conveyor 20, and is carried by the latter to a position spaced forwardly of the frame 1, where it is dumped onto a waste pile or into a vehicle for removal.

The first component, to which reference has been made, and which consists of material of high magnetic susceptibility, and which is sometimes referred to as the "metallics," is carried by the conveyor 13 to a point at which it falls or drops off the conveyor onto a double deck screen generally designated by reference numeral 21, this screen being vibrated or agitated by a motor 22.

Figure 2:
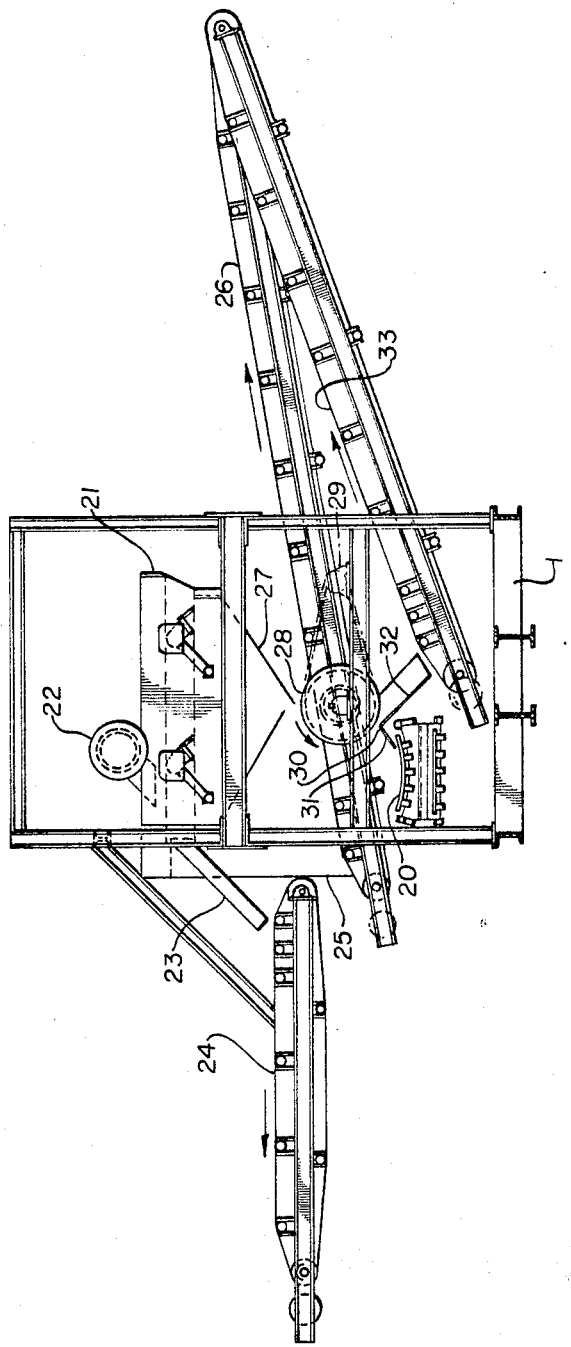
FIG. 2 is a cross-sectional view of the apparatus, taken on the line 2—2 of FIG. 1.

The material which is rejected by the upper deck of the screen 21, passes through a chute 23 and onto an endless belt conveyor 24, which extends laterally of the frame 1, as best shown in FIG. 2, and is carried by this conveyor to a point at which it is dumped into a vehicle for removal.

The material which passes through the upper deck of the screen 21, but is rejected by the lower deck, is carried by a chute 25 onto an endless belt conveyor 26 which extends laterally of the frame 1, as best shown in FIG. 2, and is carried by this conveyor to a point at which it is dumped into a vehicle for removal.

A small percentage of the material which passes entirely through both decks of the screen 21 falls through a hopper 27 and onto a reverse polarity magnetic drum separator 28 driven by a motor 29. The separator 28 has a variable field intensity for setting to required specifications. The material is separated by this drum into components, the more highly magnetic component falling off the drum at a point to the right of the apex 30 of a diverter bar 31 (see FIG. 2) and onto a chute 32 to be directed by this chute onto an endless belt conveyor 33, which extends laterally of the frame 1 (see FIG. 2), being carried by this conveyor to a point for dumping into a vehicle.

The less highly magnetic component falls off the drum at a point to the left of the apex 30 of the diverter bar 31 (see FIG. 2) and onto the waste conveyor 20.

FIG. 6 of the drawings is a flow diagram illustrating the flow of the materials which are to be processed, with the various elements or parts represented somewhat diagrammatically, and utilizing, insofar as possible, the same or corresponding reference numerals which appear in the above detailed description of the apparatus.

This flow diagram can be used conveniently in describing a specific example of the process, as follows:

It will be assumed that the material which is to be treated consists of open hearth slag which has been crushed to a size such that approximately 95% of the slag consists of particles or lumps of a size less than about 12 inches in diameter and approximately 5% of which consists of lumps of a size greater than about 12 inches in diameter.

The material is carried by a crane dragline and is dumped onto the grizzly 4, so that 95% of the material falls through the grizzly, and 5% of the material, which is rejected by the grizzly, rolls or is raked off the grizzly, and falls to the rear of the grizzly, this rejected material being cleaned of undesired slag by the impact of the fall and being then broken by an impact breaker to a size which can be passed through the grizzly.

The 95% of the original material or slag which has passed through the grizzly 4 falls through the hopper 5 and onto the upper end of the shaker feeder 6. The material falls off the lower end of the feeder 6 onto the magnetic separator 10, about 10% of this 95%, which may be referred to as the "metallics," falling onto the conveyor 13. The remaining 85% of this 95%, and which may be referred to as the "non-metallics" or the "non-magnetics," drops through the chute 14.

With the screen 16 in the position shown in solid lines in the flow diagram, the 85% of the original material which falls through the chute 14, falls onto the upper deck of the screen. The material which is rejected by the upper deck of the screen, passes through the chute 17 and onto the conveyor 15. This constitutes about 25% of the 85% to which reference has been made, and consists entirely of waste material. The material which passes through the upper deck of the screen, but is rejected by the lower deck, passes through the chute 18 and onto the conveyor 19. This constitutes about 30% of the 85% to which reference has been made, and consists of slag of a desired or specified size suitable as a blast furnace burden. The material which passes through both decks of the screen 16 falls onto the conveyor 15. This constitutes about 30% of the 85% to which reference has been made, and consists entirely of waste material. Thus, approximately 55% of the original material treated is removed as waste.

With the screen 16 in the position shown in broken lines in the flow diagram, the 85% of the original material which falls through the chute 14 is not size beneficiated but falls directly onto the waste conveyor 15.

In any event, the material which falls onto the conveyor 15 is carried by this conveyor to the lower end of the conveyor 20, and is carried by the latter onto a waste dump pile for future removal, or directly into a vehicle for removal.

The "metallics" or 10% of the 95% (of the original material), which falls onto the conveyor 13, is carried by the conveyor 13 to a point at which it falls or drops off the conveyor onto the screen 21. The material which is rejected by the upper deck, passes through the chute 23 and onto the conveyor 24, and is carried by this conveyor to a point at which it is dumped into a vehicle for removal. This material, which consists of metallics of a size of from about 3 inches to about 12 inches, comprises about 1% of the 10% to which reference has been made. The material which passes through the upper deck of the screen, but is rejected by the lower deck, passes through the chute 25 and onto the conveyor 26, and is carried by this conveyor to a point at which it is dumped into a vehicle for removal. This material, which consists of metallics of a size of from about ⅜ inch to about 3 inches, comprises about 4% of the 10% to which reference has been made. The material which passes through both decks of the screen 21 falls through the hopper 27 and onto the magnetic separator 28. This material, which consists of the metallics of a size less than about ⅜ inch, comprises about 5% of the 10% to which reference has been made.

The more highly magnetic component of this 5%, or about 3% of the 5%, is diverted by diverter bar 31 onto the chute 32 and is directed by this chute to the conveyor 33, and is carried by this conveyor to a point at which it is dumped onto a vehicle. The less highly magnetic component of this 5%, or about 2% of the 5%, is diverted by the diverter bar 31 onto the waste conveyor 20.

The percentages which have been referred to in connection with the foregoing example, are based on the sizes indicated, and it is to be understood that these percentages will vary, if other sizes are specified or indicated, in accordance with mill requirements.

In the example, which has been described, it may be noted that when the screen 16 is in the solid line position, about 57% of the 95% is disposed of as waste, about 30% of the 95% is used as blast furnace burden, about 8% of the 95% is recovered as "metallics." When the screen 16 is in the broken line position, about 87% of the 95% is disposed of as waste, and about 8% of the 95% is recovered as "metallics."

It is thus seen that I have provided a highly efficient method of reclaiming available iron or steel from open hearth slags containing iron in a free or combined state, and of beneficiating the slags for use as a blast furnace burden, fill, ballast or road surfacing medium, and that the method is adapted for the similar treatment of steel mill cleanup or debris, foundry refuse, and other materials containing such iron.

The apparatus, as described, is extremely compact in its design and arrangement of component parts or elements, to an extent that its overall dimensions are such as to enable the apparatus to be easily transported by means of a tractor or truck or narrow gauge highways and to slag dumps, for use at locations adjacent such dumps.

The apparatus, moreover, is so designed, that when it becomes necessary to transport it under bridges or viaducts, where the highway clearance is insufficient to permit the apparatus to be properly cleared, the portion of the apparatus above the floor 1a of the frame 1, may be removed from the frame, and reassembled with the frame after passage of the apparatus under the bridge or viaduct. In this connection it will also be understood that the various conveyors which extend laterally of the frame can be temporarily removed to facilitate transportation of the apparatus along highways and under bridges.

An important feature of the invention resides in the fact that the waste materials, which constitute the bulk of the original material treated is disposed of at a relatively low level, and is not required to be carried to a high level before disposal, as is characteristic of apparatus heretofore used in this art. In other words, gravity is utilized to a maximum degree or extent in the handling of the materials, and electric and mechanical power required for such handling is reduced to a minimum, with consequent savings in equipment cost and labor. These advantages flow, in large measure, from the location of the parts 5, 6, 10, 12, 14, 15 and 16 in tiered arrangement, under the grizzly 4.

With this arrangement, only the metallics, constituting a relatively small proportion of the material which is being treated, is required to be carried, as by conveyor 13, to a relatively high level for further treatment. In this way, the cost of electrical and mechanical power, as well as labor costs, are further reduced.

After treatment by the screen 21, gravity is again utilized for the flow of the materials, so that here, again, savings in cost are effected.

It may be further noted, that the various parts of the apparatus, motors, conveyors, etc., while arranged in a minimum of space, are easily accessible for repair or replacement purposes.

It is to be understood that the various changes can be made in the apparatus, and in the method, as described, without departing from the spirit of the invention or the scope of the appended claims.

I claim:

1. In apparatus of the character described, a frame, a grizzly supported by the upper portion of said frame and adapted to screen therethrough materials having metallic values, a shaker feeder disposed directly below said grizzly and adapted to receive the screened material, a magnetic separator disposed directly below said feeder and adapted to separate the screened material into two components, the first of which contains metal values in appreciable quantity and the second of which is substantially free of metal values, a first conveyor having a receiving portion disposed below said magnetic separator and adapted to receive and carry said first component to a higher level than that of said separator, a screen having upper and lower decks on which said first component falls from said first conveyor, means for vibrating said screen, a separate chute and conveyor associated therewith for disposing of each of coarse and less coarse fractions of said first component which are rejected by the upper and lower decks respectively of said screen, a reverse polarity magnetic drum separator with variable field intensity directly below said screen, a hopper directing the fine material comprising the remaining fraction of said first component which passes through both decks of said screen onto said last named separator where it is separated into higher and lower magnetic components, a separate chute and conveyor associated therewith for disposing of each of said magnetic components; another conveyor disposed at a level below said first conveyor for receiving and transporting at least a portion of said second component, and means for directing said second component from said magnetic separator to said another conveyor.

2. Apparatus, as defined in claim 1, including means for size beneficiating said second component, comprising a double deck screen disposed above said another conveyor and means for laterally moving said screen between two positions, in one of which the screen is non-operative, and in the other of which it receives said second component for size beneficiation.

References Cited by the Examiner

UNITED STATES PATENTS

| | | | |
|---|---|---|---|
| 2,728,454 | 12/1955 | Heckett | 209—38 |
| 2,971,703 | 2/1961 | Rath | 209—38 X |
| 3,049,305 | 8/1962 | Rath | 209—214 X |
| 3,178,122 | 3/1965 | Heckett | 241—76 |

HARRY B. THORNTON, *Primary Examiner.*

R. HALPER, *Assistant Examiner.*